United States Patent
Tremelling et al.

(10) Patent No.: US 10,436,204 B2
(45) Date of Patent: Oct. 8, 2019

(54) FAN ASSEMBLY FOR COOLING ELECTRIC MACHINE AND ELECTRIC MACHINE INCORPORATING SAME

(71) Applicant: ABB Schweiz AG, Baden (CH)

(72) Inventors: Darren Dale Tremelling, Apex, NC (US); Ghanshyam Shrestha, Apex, NC (US); Patrick Schneider, Saint Paul, MN (US); Zhiguo Pan, Cary, NC (US)

(73) Assignee: ABB Schweiz AG, Baden (CH)

( * ) Notice: Subject to any disclaimer, the term of this patent is extended or adjusted under 35 U.S.C. 154(b) by 735 days.

(21) Appl. No.: 14/292,150

(22) Filed: May 30, 2014

(65) Prior Publication Data
US 2015/0349609 A1    Dec. 3, 2015

(51) Int. Cl.
*H02K 9/06* (2006.01)
*F04D 19/00* (2006.01)
(Continued)

(52) U.S. Cl.
CPC ....... *F04D 19/002* (2013.01); *F04D 25/0633* (2013.01); *F04D 25/0653* (2013.01);
(Continued)

(58) Field of Classification Search
CPC ............ H02K 9/06; H02K 9/14; H02K 21/22; H02K 3/26; F04D 19/002; F04D 25/06; F04D 25/0633; F04D 25/0653; F01D 21/045; F01D 25/24; F05D 2220/36; Y02T 50/671; Y02T 50/672
See application file for complete search history.

(56) References Cited

U.S. PATENT DOCUMENTS 3,157,809 A * 11/1964 Bekey ................... H02K 21/14
                                                        310/156.27
3,588,284 A *  6/1971 Sonderborg et al. ... F04C 2/102
                                                          417/410.1
(Continued)

FOREIGN PATENT DOCUMENTS

DE      38 23 113 C1    8/1989
EP    1 050 946 A2    11/2000
(Continued)

OTHER PUBLICATIONS

JP 06311691 A, machine translation Oct. 19, 2018.*
(Continued)

*Primary Examiner* — Julio C. Gonzalez
*Assistant Examiner* — Leda Pham
(74) *Attorney, Agent, or Firm* — Taft Stettinius & Hollister LLP; J. Bruce Schelkopf (57) ABSTRACT

The subject matter described herein includes a fan assembly for cooling an electric machine and an electric machine incorporating such a fan assembly. One exemplary fan assembly according to the subject matter described herein includes a first fan annulus for surrounding a portion of an electric machine. The fan assembly further includes a fan drive circuit for driving the first fan annulus separately from a drive mechanism of the electric machine. The first fan annulus is configured to be, when rotating to cool the electric machine, mechanically disconnected from a housing and a rotor of the electric machine and separated from the housing by radial gap.

32 Claims, 10 Drawing Sheets

(51) Int. Cl.
  *H02K 9/14* (2006.01)
  *F04D 25/06* (2006.01)
  *H02K 21/22* (2006.01)
  *H02K 3/26* (2006.01)
  *F04D 29/58* (2006.01)

(52) U.S. Cl.
  CPC ........... *H02K 9/14* (2013.01); *F04D 29/5806* (2013.01); *H02K 3/26* (2013.01); *H02K 21/22* (2013.01)

(56) References Cited

U.S. PATENT DOCUMENTS

| | | | |
|---|---|---|---|
| 4,752,194 A | 6/1988 | Wienen et al. | |
| 5,305,601 A | 4/1994 | Drain et al. | |
| 6,069,421 A | 5/2000 | Smith et al. | |
| 6,125,528 A | 10/2000 | Van Dine et al. | |
| 6,150,743 A | 11/2000 | Van Dine et al. | |
| 6,924,574 B2* | 8/2005 | Qu | H02K 21/16 310/112 |
| 7,091,635 B1* | 8/2006 | Gilliland | F04D 29/282 310/62 |
| 8,476,800 B2* | 7/2013 | Lai | F04D 25/0606 310/179 |
| 2010/0283336 A1* | 11/2010 | Vasilesco | H02K 9/04 310/62 |
| 2012/0175978 A1* | 7/2012 | Quiring | H02K 9/06 310/63 |
| 2012/0205998 A1* | 8/2012 | Seibicke | H02K 5/20 310/64 |
| 2013/0093276 A1* | 4/2013 | Kim | H02K 16/00 310/114 |
| 2013/0164158 A1* | 6/2013 | Matsuba | F04D 17/16 417/410.1 |

FOREIGN PATENT DOCUMENTS

| | | |
|---|---|---|
| EP | 2 497 625 A1 | 9/2012 |
| JP | 55139044 A | 10/1980 |
| JP | 59222057 A | 12/1984 |
| JP | 05083903 A * | 4/1993 |
| JP | 06311691 A * | 11/1994 |
| JP | 11046465 A | 2/1999 |
| WO | WO 2014/15260 A1 | 10/2014 |

OTHER PUBLICATIONS

JP05083903 A machine translation Oct. 19, 2018.*
Commonly-assigned, co-pending International Application No. PCT/US13/76167 for "Composite Frame for Electrical Machines and Methods for Making Same," (Unpublished, filed Dec. 18, 2013).
"Filament Winding," http://www.advancedcomposites.com/index.php?Itemid=78&id=48&option=com_content&view=article, pp. 1-3 (Copyright 2012, downloaded from the Internet Oct. 2, 2012).
"Pultrusion," http://www.strongwell.com/pultrusion/, pp. 1-2 (Copyright 2012, downloaded from the Internet Oct. 2, 2012).
"Pultrusion Process," http://www.libertypultrusions.com/pultrusion-process-frp.htm, p. 1 (Copyright 2007-2010, downloaded from the Internet Oct. 2, 2012).
Peters et al., "Filament Winding Composite Structure Fabrication," http://composite.about.com/library/products/aafpr020828.htm, p. 1 (Publication Date Unknown, downloaded from the Internet Oct. 2, 2012).
"Pultrusion—How the composite pultrusion process works," http://www.pultrusions.org/articles/pultrusion_works.html, pp. 1-3 (Publication Date Unknown, downloaded from the Internet Oct. 2, 2012).
"Teufelberger: Braided Composite Parts," http://www.teufelberger.com/en/products/composite/braided-composite-parts.html, pp. 1-3 (Publication Date Unknown, downloaded from the Internet Oct. 2, 2012).
Tremelling, "On the Design and Analysis of Printed Circuit Board in a High Speed Surface Permanent Magnet Axial Flux Machine," Dissertation, University of Wisconsin-Madison, pp. 1-284 (2009).
Desale et al., "Prediction of air delivery, noise and power consumption of fan for TEFC electric motors," Journal of Scientific & Industrial Research, vol. 65, pp. 344-348 (Apr. 2006).
Mallick, "Fiber-Reinforced Composites, Materials, Manufacturing, and Design," Second Edition, Revised and Expanded, Chapter Two, p. 24 (1993).
Notification of Transmittal of the International Search Report and Written Opinion of the International Searching Authority, or the Declaration for International Application No. PCT/US2013/076167 (dated Jul. 25, 2014).
"Flexible PCB, FPCB, rigiid-flex PCB, Flex-rigid PCB, Quick turn PCB," Hitech Circuits PCB Co., Limited, http://www.imexbb.com/flexible-pcb-fpcb-rigid-flex-pcb-flex-rigid-pcb-quick-turn-pcb-10902690.htm, pp. 1-2 (.Dec. 19, 2011).

* cited by examiner

7.2d FEA RESULT WITH FERRITE MAGNETS ($a_p=0.7$, $m_t=6[mm]$)

FAN ASSEMBLY FOR COOLING ELECTRIC MACHINE AND ELECTRIC MACHINE INCORPORATING SAME

TECHNICAL FIELD

The subject matter described herein relates to cooling of electric machines. More particularly, the subject matter described herein relates to a fan assembly for cooling an electric machine and an electric machine incorporating such a fan assembly.

BACKGROUND

Figure 1:
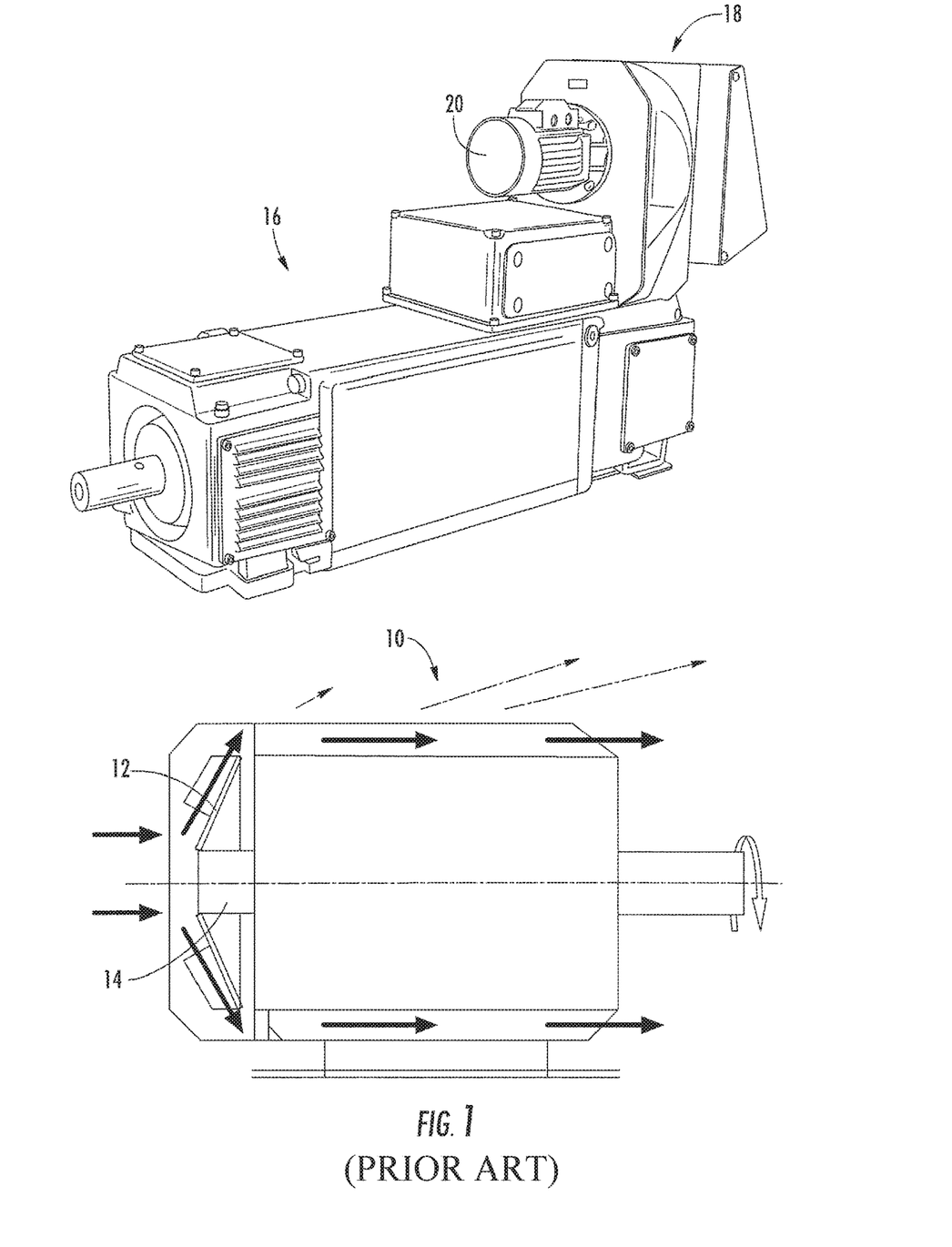
FIG. 1 illustrates electric machines with conventional cooling fans.

In conventional electrical machines, fans are commonly used to enhance cooling of the machine, allowing for increased power density over that which can be achieved by the machine without a cooling fan. Cooling fans can be shaft mounted or separately attached electric machine. FIG. 1 illustrates two examples of conventional cooling fans and their attachment to electric machines. Referring to FIG. 1, the lower drawing illustrates an electric machine 10 where a fan 12 is mechanically attached to a shaft 14 of machine 10. The upper drawing in FIG. 1 illustrates another electric machine 16 where a fan assembly 18 is separately attached to a non-drive end of electric machine 16. In this example, fan assembly 18 requires a separate drive machine 20 dedicated to driving the fan.

Shaft mounted fans are typically bidirectional, which allows for flexibility in application, but with drawbacks of noise and efficiency of air flow. Separately mounted fans add significant cost, mass and losses to the system. Shaft-mounted fans allow for effective cooling near the fan end of the machine. However, cooling at regions of the machine that are axially spaced from the fan is less. In addition, due to the shaft mounting, there is significant stiffness and robustness to the fan, which requires a fan guard to keep fingers and other items from becoming entangled in such fan.

In an example machine of 15 kW rating, and 4 pole design, the power required to drive a shaft-mounted fan may be on the order of 50 W, or about 0.25 Nm, while the machine has a torque of about 80 Nm. As the fan is attached to the non-drive end of the shaft, there exists a passage for the shaft and possibly required sealing, which attempts to reduce contamination of the interior elements of the machine from external sources. This particular shaft mounted fan may result in quite high convection coefficients near the fan, being around 60-100 $W/m^2K$ in some examples, which may be referred as the non-drive end (NDE) of the machine. On the end of the machine nearer the shaft, which is connected to the driven equipment, the convection coefficients may be around 20 $W/m^2K$. Thus, the temperature of the frame surface near the drive end (DE) is substantially higher than the fan end, and the interior portions of the machine near the drive end are also at substantially higher temperatures compared to the fan end of the machine. These high temperatures have detrimental effects on the losses of the windings and the lifetime of the bearings and winding insulations, which are desired to be reduced.

In light of these difficulties, there exists a need for an improved fan assembly for an electric machine and for an electric machine that incorporates such a fan assembly.

SUMMARY

The subject matter described herein includes a fan assembly for cooling an electric machine and an electric machine incorporating such a fan assembly. One exemplary fan assembly according to the subject matter described herein includes a first fan annulus for surrounding a portion of an electric machine. The fan assembly further includes a fan drive circuit for driving the first fan annulus separately from a drive mechanism of the electric machine. The first fan annulus is configured to be, when rotating to cool the electric machine, mechanically disconnected from a housing and a rotor of the electric machine and separated from the housing by radial gap.

The term "electric machine", as used herein, is intended to refer to a structure that could be an electric motor or an electric generator.

BRIEF DESCRIPTION OF THE DRAWINGS

The subject matter described herein will now be explained with reference to the accompanying drawings of which.

DETAILED DESCRIPTION

Figure 2A:
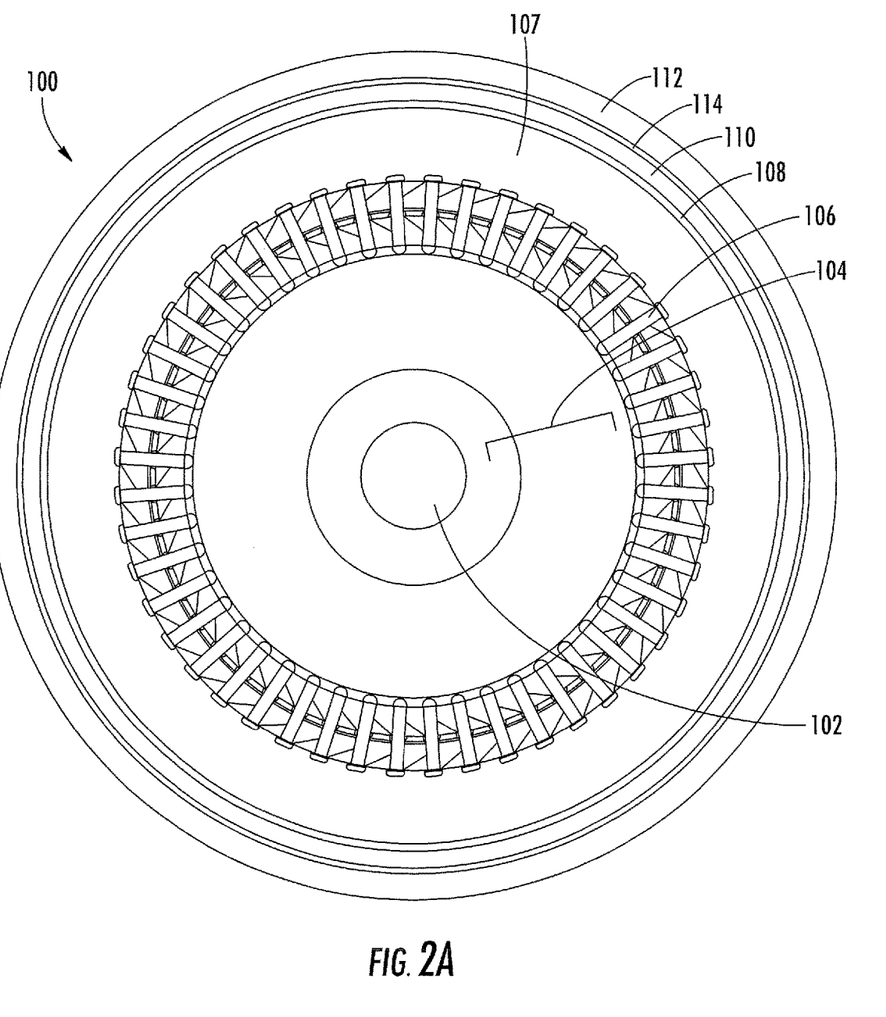
FIG. 2A is a cross-sectional view of an electric machine with an integrated cooling fan according to an embodiment of the subject matter described herein.

The subject matter described herein includes a fan assembly for cooling an electric machine and an electric machine incorporating such a fan assembly. FIG. 2A is a cross-sectional view illustrating a fan assembly where the fan comprises an annulus surrounding the outer diameter of the machine housing and separated from the housing by an air gap. In such an embodiment, the housing is preferably formed of an electrically non-conductive composite material to reduce magnetic flux loss due to eddy currents. An example of a composite housing suitable for use with embodiments of the subject matter described herein is described in commonly assigned PCT patent application no. PCT/US13/76167, filed Dec. 18, 2013, the disclosure of which is incorporated herein by reference in its entirety. Briefly, such a composite frame may be made using filament wound nonconductive fibers, pultruded non-conductive fibers, extruded non-conductive fibers, or resin infused with non-conductive fibers. Such fibers are preferably long, with an aspect ratio of at least about 1500. The fibers are preferably formed of polymeric, non-electrically conductive, non-magnetic materials. Exemplary materials that may be used for the fibers may include glass, aramid, carbon, or basalt materials. Carbon fibers are electrically conductive. As such, if carbon fibers are used, an insulating veil layer of fibers may be used between the electrically conductive carbon fibers in that of the stator laminations. Additional details of the composites housing are described in the subject PCT Application.

A magnetic drive circuit separate from the drive circuit used to drive the machine may be used to drive the fan. Using a magnetic drive circuit separate from that used to drive the machine allows the speed of the fan to be controlled independently of the speed of the machine. As a result, cooling of the machine can be achieved even when the machine is operating in a low RPM mode, for example, due to heavy loading or spin down.

Referring to FIG. 2A, electric machine 100 includes a shaft 102, a rotor 104 mechanically connected to shaft 102 for rotating with shaft 102, stator windings 106 circumferentially surround rotor 104 for magnetically driving rotor 104 and rotating the shaft. Stator laminations 107 circumferentially surround stator windings 106. A fan drive circuit 108 may be adhesively attached to the inner diameter of a composite housing 110. Fan drive circuit 108 may include traces printed on a flexible substrate that when excited with a current produce magnetic flux usable to drive a fan annulus 112. In the illustrated example, fan annulus 112 circumferentially surrounds the outer diameter of housing 110 and is separated from housing 110 via an air gap 114. Because housing 110 is preferably made from a composite material, there is low magnetic flux loss between fan drive circuit 108 and fan annulus 112. Fan annulus 112 may be made of a light weight material with embedded magnetic materials. In one embodiment, fan annulus 112 may be a nonmagnetic material, such as aluminum, or a non-conductive composite material with embedded magnets. In one embodiment, fan annulus housing 110 or an end bell of housing 110 may include a circumferential guiding groove (not shown) for mechanically restraining movement of annulus 112 in the axial direction. Air gap 114 may serve as an air bearing for such a fan.

Fan annulus 112 may be designed to have a breakdown torque so that external blockage or interference will not damage fan annulus 112. The magnets embedded in fan annulus 112 may be made of ferrite materials, preferably placed near housing 110, and of relatively high pole count (greater than 20 poles, and designed in a manner to that a limited moment of inertia of the fan annulus 112 is obtained). This minimal inertia may be important, as any potential blockage could absorb the energy of the rotating fan. Thus, to reduce damage due to blockage of the fan, the magnetic energy driving the fan should be minimal.

It is believed that end winding leakage flux may not be effective in driving the fan due to the low pole count and low value of leakage flux density in these regions. Accordingly, fan annulus 112 may be driven using winding flux that is separate from the end flux produced by the windings of the electric machine.

Figure 2B:
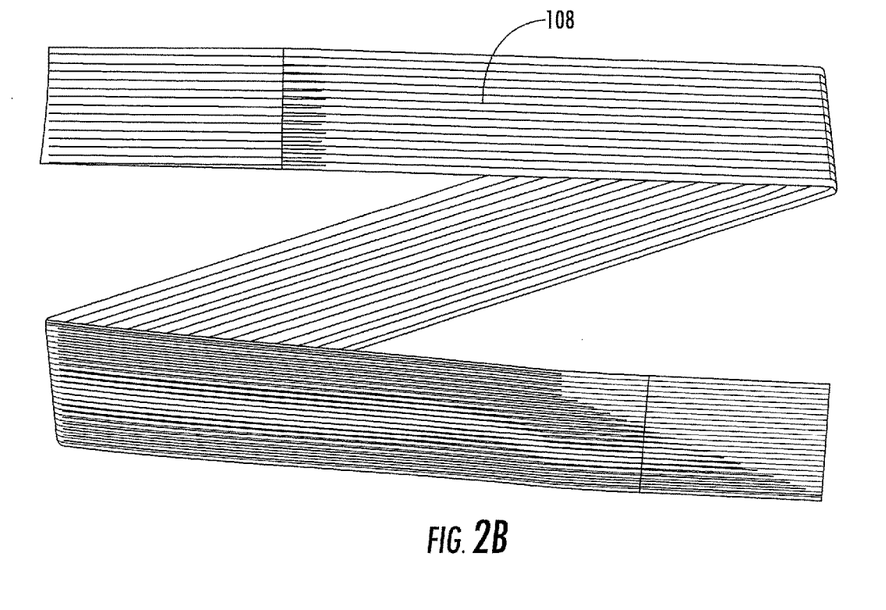
FIG. 2B is a diagram of a flexible printed circuit board (PCB) that can be used to form a fan drive circuit according to an embodiment of the subject matter described herein.

In the example illustrated in FIG. 2A, radial magnetic flux generated by electric current flowing through windings of fan drive circuit 108 may be used to magnetically drive fan annulus 112. FIG. 2B illustrates an exemplary flexible printed circuit board material that can be used to form fan drive circuit 108. In FIG. 2B, fan drive circuit 108 is a flexible PCB stator with conductive traces printed on a flexible band or tape like material that may be attached to the inner diameter of housing 110. Such traces can be used to produce radial magnetic flux paths, such that magnetic flux flows radially outward from fan drive circuit 108, through housing 110, through air gap 114, radially through fan annulus 112. The return path for the magnetic flux would be radially inward through fan annulus 112, air gap 114, housing 110, and fan drive circuit 108.

Figure 3:
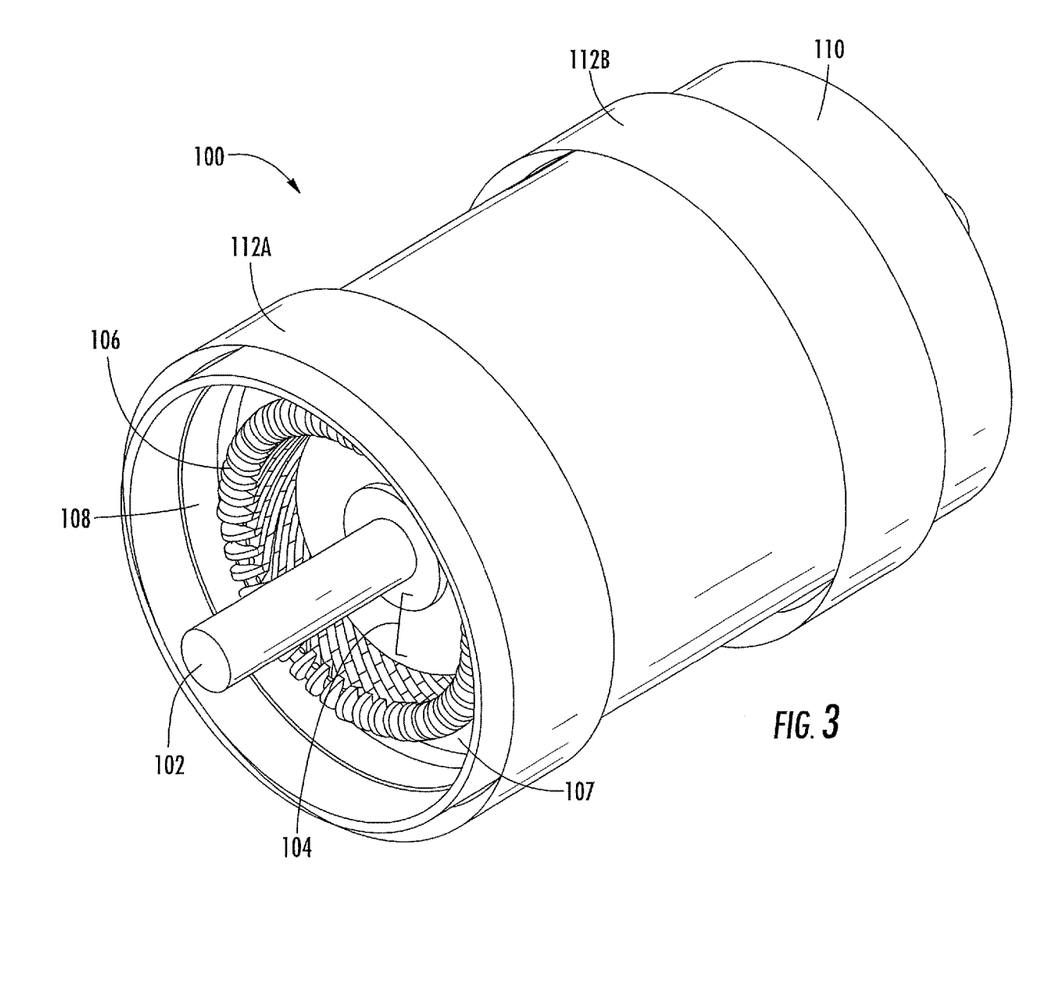
FIG. 3 is a perspective view of an electric machine with integrated cooling fans according to an embodiment of the subject matter described herein.

FIG. 3 is a perspective view of the fan assembly and the electric machine of FIG. 2A. In FIG. 3, electric machine includes two fan annuluses 112A and 112B that circumferentially surround the outer diameter of housing 110 and are axially spaced from each other. In the example illustrated in FIG. 3, fan annulus 112A is located near the drive end of machine 100, and fan annulus 112B surrounds the stack portion of machine 100, where the stack portion is the portion that encloses stator 106 and rotor 104. In FIG. 3, each fan annulus may include its own fan drive circuit 108. Alternatively, a single fan drive circuit 108 may drive both fan annuluses 112A and 112B. It should also be noted that any number of fan annuluses is intended to be within the scope of the subject matter described herein.

It can be assumed that convection near fan annuluses 112A and 112B may be significantly higher than without annuluses 112A and 112B. If it can be assumed that the convection coefficient along the axial length of housing 110 could be 70 W/m$^2$K, the same amount of heat may possibly be taken from the band portion of the machine with a 20 K reduction in required temperature rise in the stator from the nominal case without such a fan.

Figure 4:
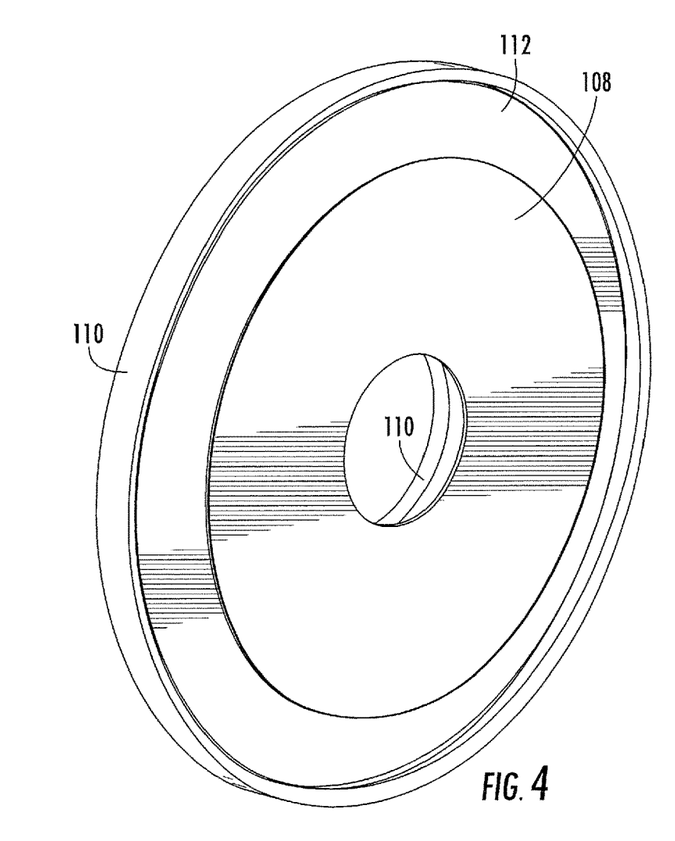
FIG. 4 is a perspective view of a fan for axial flux operation according to an embodiment of the subject matter described herein.
Figure 5:
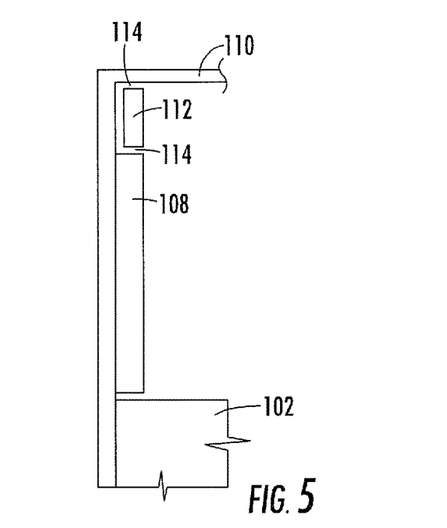
FIG. 5 is a cross-sectional view of a fan for axial flux operation and a portion of an electric machine according to an embodiment of the subject matter described herein.

In the examples illustrated in FIGS. 2A and 3, fan annulus 112 has a profile designed to be rotated using radial magnetic flux flow. For example, fan annulus 112 illustrated in FIGS. 2A and 3 forms a circular band that is wider in the axial direction than in the radial direction to present a larger profile for radial flux. In an alternate embodiment, fan annulus 112 may be designed or have a profile for facilitating axial magnetic flux flow. For example, as illustrated in FIGS. 4 and 5, fan annulus 112 may be a circular member with a greater width in the radial direction than in the axial direction to present a larger profile for axial magnetic flux flow. FIGS. 4 and 5 illustrate such an example. In FIG. 4, fan annulus 112 is located within an inner diameter of housing 110. Fan drive circuit 108 is located within the inner diameter of fan annulus 112 and may include conductive traces that form a magnetic drive circuit for driving fan annulus 112 by producing magnetic flux in the axial direction. Fan drive circuit 108 may be adhesively or otherwise attached to the end of housing 110. Air gaps 114 may exist between fan annulus 112 and housing 110 and between fan annulus 112 and fan drive circuit 108.

Figure 6:
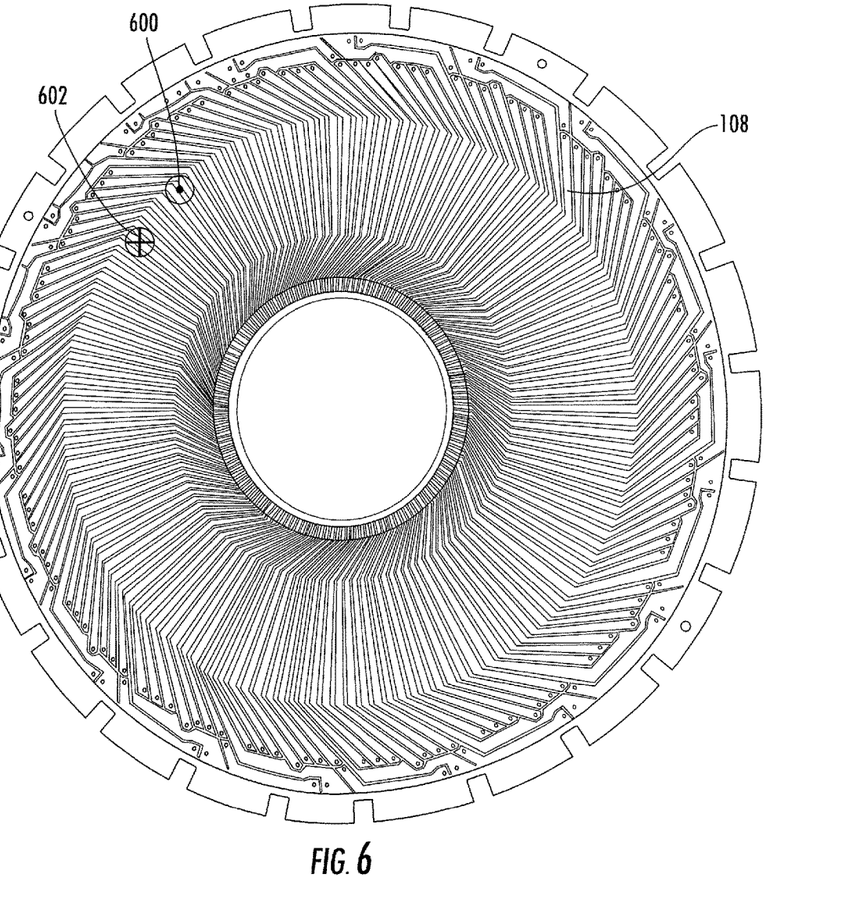
FIG. 6 illustrates a fan drive circuit implemented using a rigid PCB stator with windings formed by traces according to an embodiment of the subject matter described herein.

FIG. 6 illustrates an example of fan drive circuit 108 comprising PCB stator suitable for producing axial magnetic flux flow for driving the annulus illustrated in FIGS. 4 and 5. In FIG. 6, fan drive circuit 108 includes conductive traces printed on a disk-shaped rigid substrate. The traces are designed to produce flux in the axial direction as indicated by the arrow head 600 and tail 602 illustrated schematically in FIG. 6. Fan drive circuit 108 may be mounted axially near the end of housing 110, as illustrated in FIGS. 4 and 5. As with the embodiments described above, housing 110 is preferably of a non-electrically conductive, magnetically permeable material, such as a polymeric composite. In such a configuration, fan annulus 112 may include embedded magnets, but with axial magnetization orientation.

In FIG. 6, a single arrow head 600 and a single arrow tail 602 are illustrated for simplicity. However, it is understood that fan drive circuit 108 may form pole pairs spaced around the entire circumference of fan drive circuit 108.

The subject matter described herein is not limited to driving fan annulus using axial or radial magnetic flux. In an alternate arrangement, fan annulus 112 may be driven using transverse magnetic flux, where transverse flux refers to flux flow in a direction transverse to the axis of the electric machine. In such an embodiment, fan annulus 112 may include embedded magnetic structures that are oriented for transverse magnetization. Fan drive circuit 108 may be oriented to produce magnetic flux in the transverse direction.

Figure 7:
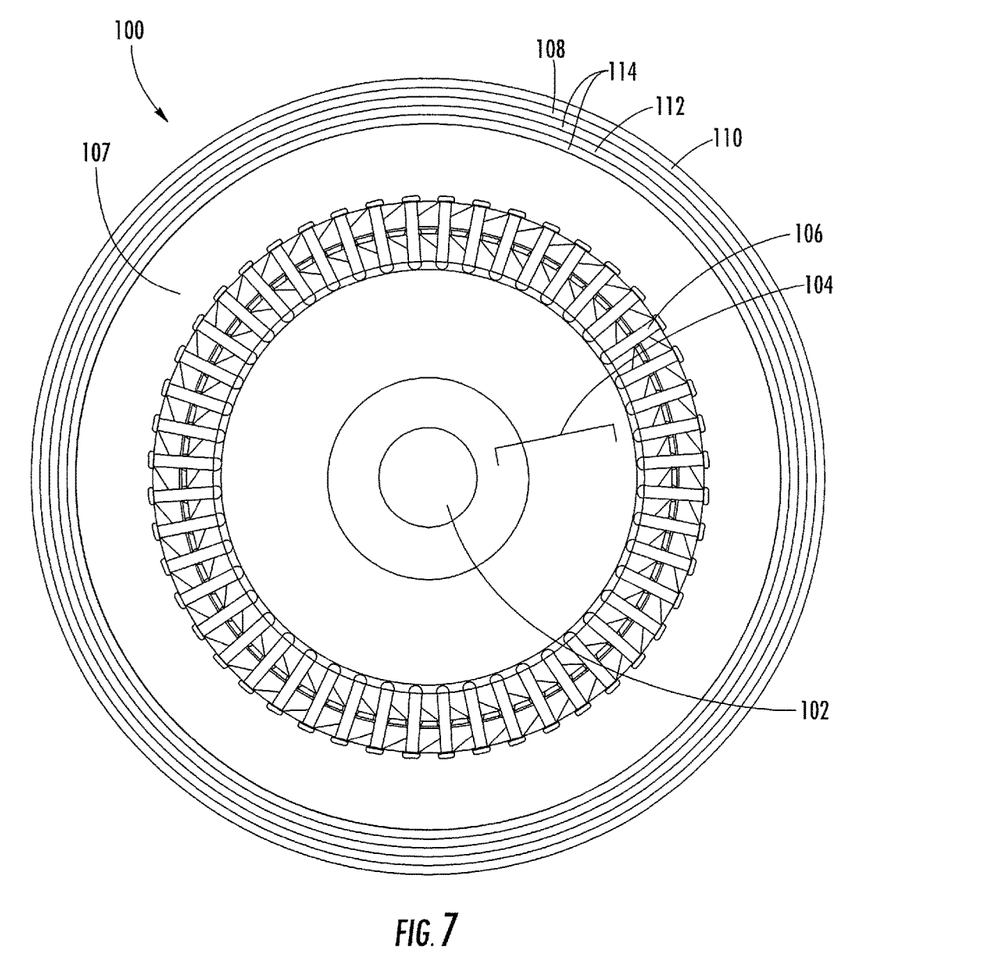
FIG. 7 is a cross-sectional view of an electric machine with an integrated fan assembly according to an alternate embodiment of the subject matter described herein.

In the examples described above with respect to FIGS. 2A, 3, and 4, fan annulus 112 surrounds the outer diameter of housing 110 and is designed for radial magnetic flux flow. In an alternate embodiment, fan annulus 112 may be located within the inner diameter of housing 110 and may also be designed for radial magnetic flux flow. FIG. 7 illustrates an example where fan annulus 112 is located within the inner diameter of housing 110 and designed for radial magnetic flux flow. Referring to FIG. 7, housing 110 surrounds fan annulus 112. Fan annulus 112 surrounds the stator of the electric machine. Air gaps 114 are located between fan annulus 112 and stator laminations 107 on the other side. In operation, when current is applied to fan drive circuit 108, magnetic flux is produced in the radial direction which causes fan annulus 112 to rotate. The rotation of fan annulus 112 creates air current within housing 110, which may cool components within housing 110.

Figure 8:
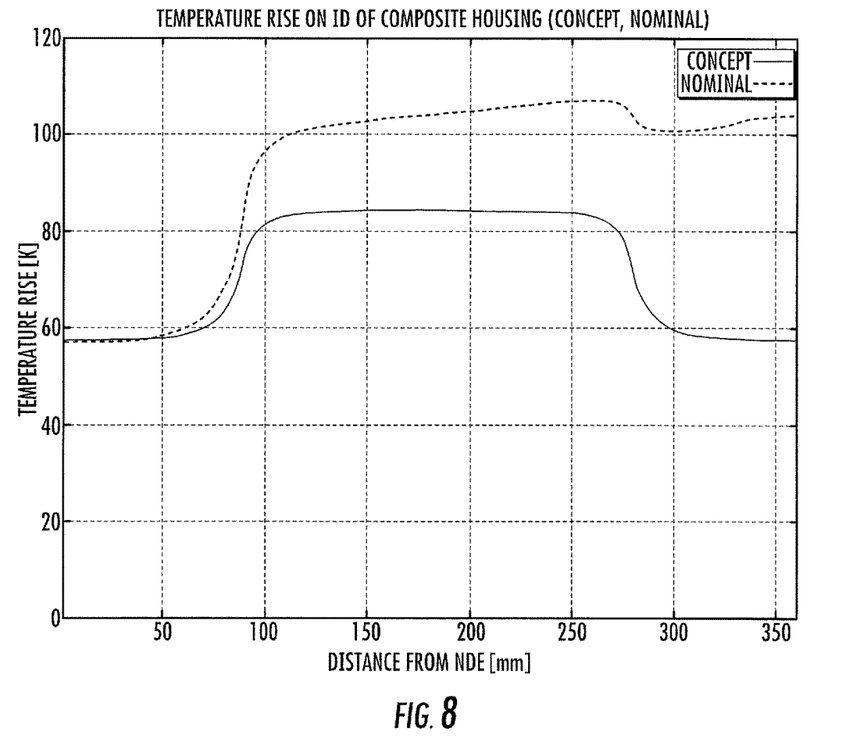
FIG. 8 is a graph illustrating results from simulation of temperature on the inner diameter of the housing along the axial length of the machine measured from the NDE according to an embodiment of the subject matter described herein.

FIG. 8 is a graph of simulation results of temperature rise on the inner diameter of a composite housing both with and without a fan assembly according to the embodiment of the subject matter described herein. The horizontal axis in the graph is the distance from the non-drive end of the machine in millimeters. The vertical axis represents the temperature rise in Kelvins. The line labeled "nominal" represents the temperature rise without an integrated fan according to an embodiment of the subject matter described herein. The line labeled "concept" illustrates the temperature rise with an integrated fan according to an embodiment of the subject matter described herein.

In one exemplary evaluation illustrated in FIG. 8, it is assumed that the composite frame has a thickness of about 5 mm, with thermal conductivity of about 0.4 W/mK. The convection coefficient of the inner diameter of the housing on the ends is assumed to be 70 W/m$^2$K, with internal air temperature of 80° C. for the non-drive end cases, as well as the drive end for the concept, but with the DE taking a temperature of 120° C. for the nominal case. The convection coefficients in the nominal case are stepped from 80 W/m$^2$K on the non-drive end to 20 W/m$^2$K on the drive end. The convection coefficient is set to 70 W/m$^2$K across the axial length of the band for the concept case, due to the placement of concept fans on non-drive end and drive end of the band (near end winding locations). The stator temperature of the nominal case was 145° C., while for the concept a value of 125° C. was needed to obtain the heat flux in the finite element method magnetics (FEMM) model of 730 W in both models.

One observation from these results is that the non-drive end behaves similarly in both cases, but the temperature of the drive end dramatically drops on the inner diameter of the housing due to the increase of heat flux in this region, due to reduction in thermal resistance on the outer surface of the housing. This reduction in temperature may also allow for lower glass transition temperature (Tg) materials to be used for the housing.

Figure 9:
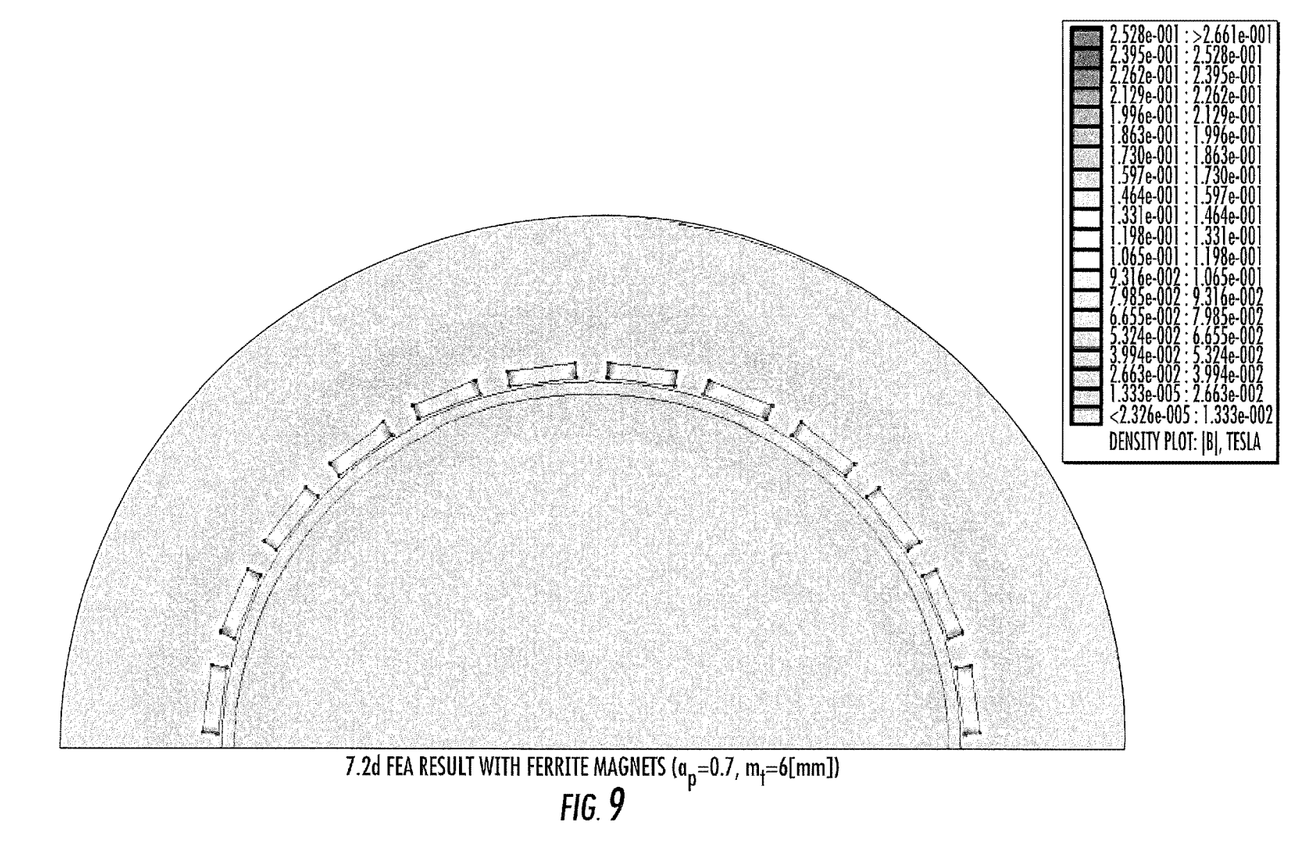
FIG. 9 is a diagram illustrating results from simulation of magnetic flux density distribution in a fan with embedded magnets according to an embodiment of the subject matter described herein.

FIG. 9 illustrates flux density distribution from the concept modeled in 2D using finite elements (FEMM), and ferrite magnets placed in locations which could be inside the fan structure. No magnetic materials beyond the magnets were modeled, thus there is no iron in the structure. The use of iron would increase the torque capability of the fan, but may introduce variations in magnetic pull that may be not desired.

Figure 10:
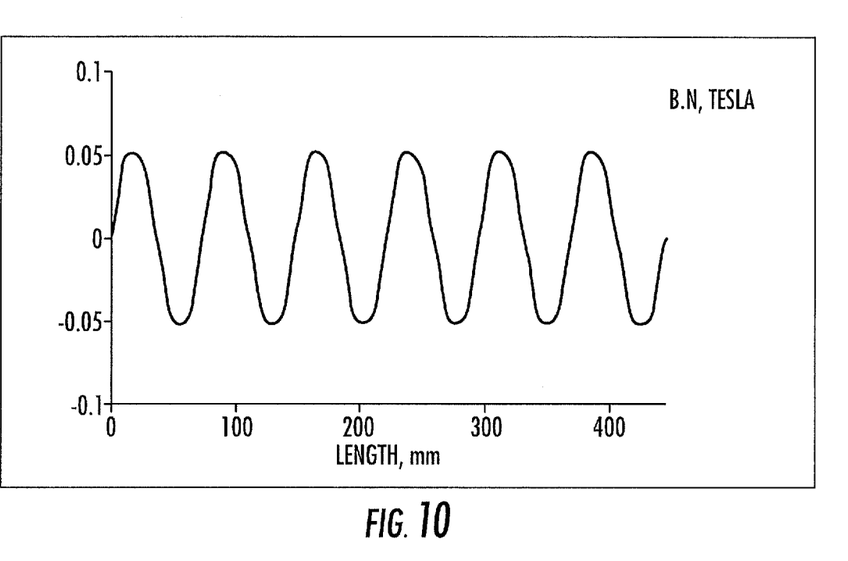
FIG. 10 is a graph of results from simulation of magnetic flux density distribution at the winding location in an electric machine included in integrating cooling fan according to an embodiment of the subject matter described herein.

FIG. 10 is a graph of simulation results of the magnetic flux density distribution at placement of a winding along the air gap. In FIG. 10, the horizontal axis represents the length of the housing in the axial direction in millimeters and the vertical axis represents magnetic flux density in Teslas. While the flux density is low at the winding location (inner diameter of housing), the flux may be enough for a winding to interact with and result in enough torque to rotate the fan to the desired extent.

Figure 11:
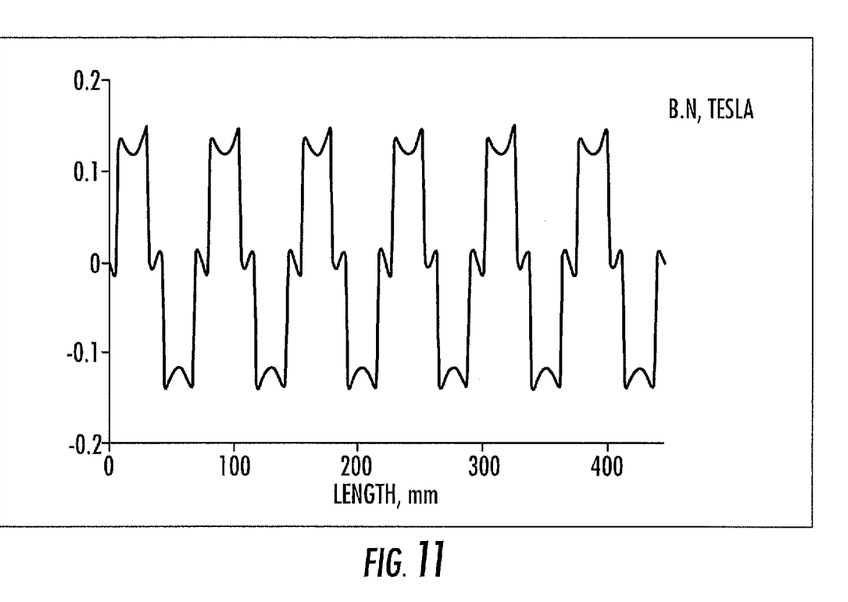
FIG. 11 is a graph illustrating results from simulation of magnetic flux density at the winding location with dual fans with ferrite magnets located in each fan according to an embodiment of the subject matter described herein.

If fans driven by the windings are placed inside as well as outside the housing, the simulated flux density distribution appears as illustrated in FIG. 11. FIG. 11 is a graph illustrating simulation of magnetic flux density distribution at a winding location on the inner diameter of the housing with two fans, one located within the inner diameter of the housing and the other surrounding the outer diameter of the housing. In FIG. 11, the horizontal axis represents axial length of the housing in millimeters and the vertical axis represents magnetic flux density at the winding location in Teslas.

Applications

One use or application of the subject matter described herein is the enhancement of cooling of electrical machines. The subject matter described herein would potentially reduce the convective thermal resistances on the exterior(s) and interior of the machines.

Problems Potentially Solved

In electrical machines above a certain size, the use of cooling fans is required to attain an economic arrangement that customers find suitable. Currently, fans are generally shaft mounted on the non-drive end of the electrical machine. Thus, the fan is typically limited to the speed of rotation of the machine and requires sealing on the exposed NDE bearing. Due to the mechanical attachment of the fan to the shaft, a fan guard is also then required.

Also, when one evaluates the potential of utilizing a composite structure to house a machine, the thermal conductivity is often seen as limiting factor in utilization of the machine. The low thermal conductivity of the composite housing creates a much larger temperature rise than might otherwise be obtained through conventional metallic housings. However, the temperature rise across the housing is only about ⅛ to 1/12 of the overall temperature rise found from the stator windings to ambient. Thus, even with a non-conductive housing, an externally or internally mounted air gap fan as described herein may be used to efficiently cool such a machine.

Potential Advantages

The following list illustrates potential advantages of the subject matter described herein:

The ability to increase apparent (and consistent) convection in the axial direction
  Conventional shaft mounted fans give good heat transfer near the fan, but poor on the other end of the frame.
The ability to reduce temperature rise of machine (or increase power rating of a machine)
  A conventional machine has limited heat flux out of the machine near the drive end.
The ability to provide cost effective, lightweight, low profile means to obtain variable speed operation of a motor with the proposed fan assembly (and ability to vary fan speed independently of the motor speed)
  Current motor designs in which the fan speed can be varied independently of the motor speed require a separate fan/blower attached to the shaft or the housing.
The ability to remove NDE bearing sealing requirement)
  A shaft mounted fan requires an extension to the shaft on the non-drive end. An air gap fan as described herein does not require a shaft extension or bearing seating, as the air gap functions as a bearing.
Reduce windage losses with unidirectional fan design
  Bidirectional fans have low efficiency.
The ability to place air flow exactly where needed when utilized inside of frame
  Existing fans cannot effectively direct air flow inside of the housing with wafters on rotor alone, thus end windings may be hotter than they need to be.

Possible Modifications

The following are possible modifications and improvements to the fan assemblies described herein:

The fan profile, speed, and placement along the frame may be modified or varied, depending on the application and the location of the desired cooling. For example, fan annulus 112 may include radially or axially extending structures that are circumferentially spaced about fan annulus 112 to change the air flow produced by rotation of fan annulus 112. Winding configuration would also be of interest, to determine what winding layouts are most suitable for PCB structures.
The winding structure (i.e., the windings used for fan drive circuit 108) could be made embedded into the composite structure of the housing, depending upon the composite fabrication method.
Fan annulus 112 may be installed in any number of ways. For instance, fan annulus 112 could be installed around housing 110 similar to a bicycle chain, whereas a single link completes the structure.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A fan assembly for cooling an electric machine, the fan assembly comprising:
   a first fan annulus for surrounding a portion of an electric machine;
   a fan drive circuit for magnetically driving the first fan annulus separately from a drive mechanism of the electric machine; and
   wherein the first fan annulus is configured, when rotating, to cool the electric machine and wherein the first fan annulus is physically detached from a housing, a shaft, and a rotor of the electric machine and separated from the housing by a radial gap.

2. The fan assembly of claim 1 wherein the first fan annulus is configured to surround an outer diameter of the housing of the electric machine.

3. The fan assembly of claim 1 wherein the first fan annulus is configured to surround a stator of the electric machine within an inner diameter of the housing of the electric machine.

4. The fan assembly of claim 1 wherein the first fan annulus is configured to rotate near a drive end and/or non-drive end of the electric machine.

5. The fan assembly of claim 1 wherein the first fan annulus is configured to rotate around a stack portion of the electric machine.

6. The fan assembly of claim 1 comprising at least one second fan annulus axially spaced from the first fan annulus, wherein the second fan annulus is mechanically disconnected from the housing and the rotor of the electric machine and is separated from the housing by a radial gap.

7. The fan assembly of claim 1 wherein the first fan annulus includes integrated magnetic material.

8. The fan assembly of claim 7 wherein the integrated magnetic material comprises magnets circumferentially spaced from each other in the first fan annulus.

9. The fan assembly of claim 1 wherein the first fan annulus is configured to be driven using radial magnetic flux.

10. The fan assembly of claim 1 wherein the first fan annulus is configured to be driven using axial magnetic flux.

11. The fan assembly of claim 1 wherein the first fan annulus is configured to be driven using transverse magnetic flux.

12. The fan assembly of claim 1 wherein the fan drive circuit comprises a flexible printed circuit board (PCB) stator configured to attach to an inner diameter of the housing.

13. The fan assembly of claim 1 wherein the fan drive circuit comprises a rigid printed circuit board (PCB) stator comprising a disk-shaped member configured to be located within an inner diameter of the housing.

14. The fan assembly of claim 1 wherein the fan drive circuit is integrated within a composite structure of the housing.

15. An electric machine with an integrated cooling fan, the electric machine comprising:
    a shaft;
    a rotor mechanically connected to the shaft for effecting rotation of the shaft;
    a stator circumferentially surrounding the rotor, the stator including at least one coil for magnetically driving the rotor;
    a housing for surrounding the stator; and
    a fan assembly comprising a first fan annulus physically detached from the stator, the rotor, the shaft, and the housing, and a fan drive circuit separate from the stator for magnetically driving the first fan annulus.

16. The electric machine of claim 15 wherein the first fan annulus is configured to surround an outer diameter of the housing of the electric machine.

17. The electric machine of claim 15 wherein the first fan annulus is configured to surround a stator of the electric machine within an inner diameter of the housing of the electric machine.

18. The electric machine of claim 15 wherein the first fan annulus is configured to rotate near a drive end of the electric machine.

19. The electric machine of claim 15 wherein the first fan annulus is configured to rotate around an active portion of the electric machine.

20. The electric machine of claim 15 comprising at least one second fan annulus axially spaced from the first fan annulus, wherein the second fan annulus is mechanically disconnected from the housing and the rotor of the electric machine and is separated from the housing by a redial gap.

21. The electric machine of claim 15 wherein the first fan annulus includes integrated magnetic material.

22. The electric machine of claim 21 wherein the integrated magnetic material comprises magnets circumferentially spaced from each other in the first fan annulus.

23. The electric machine of claim 15 wherein the first fan annulus is configured to be driven using radial magnetic flux.

24. The electric machine of claim 15 wherein the first fan annulus is configured to be driven using axial magnetic flux.

25. The electric machine of claim 15 wherein the first fan annulus is configured to be driven using transverse magnetic flux.

26. The electric machine of claim 15 wherein the fan drive circuit comprises a flexible printed circuit board (PCB) stator configured to attach to an inner diameter of the housing.

27. The electric machine of claim 15 wherein the fan drive circuit comprises a rigid printed circuit board stator comprising a disk-shaped member configured to be located within an inner diameter of the housing.

28. The electric machine of claim 15 wherein the fan drive circuit is integrated within a composite structure of the housing.

29. An electric machine with an integrated cooling fan, the electric machine comprising:
a shaft;
a rotor coupled to the shaft for rotating with the shaft;
a stator circumferentially surrounding the rotor, the stator including at least one coil for magnetically driving the rotor;
a composite housing for surrounding the stator; and
a fan assembly comprising a fan annulus physically detached from the stator, the rotor, the shaft, and the housing for rotating and facilitating cooling of the electric machine and a fan drive circuit comprising a printed circuit board (PCB) stator for driving the fan annulus separately from the electric machine.

30. The fan assembly of claim 1 wherein the radial gap serves as an air bearing for the first fan annulus.

31. The electric machine of claim 15 further comprising an air gap that serves as an air bearing for the first fan annulus.

32. The electric machine of claim 29 further comprising an air gap that serves as an air bearing for the fan annulus.

* * * * *